March 12, 1968 B. H. PINCKAERS 3,373,296
AC MAGNITUDE RESPONSIVE ELECTRONIC RELAY
Filed Oct. 2, 1964
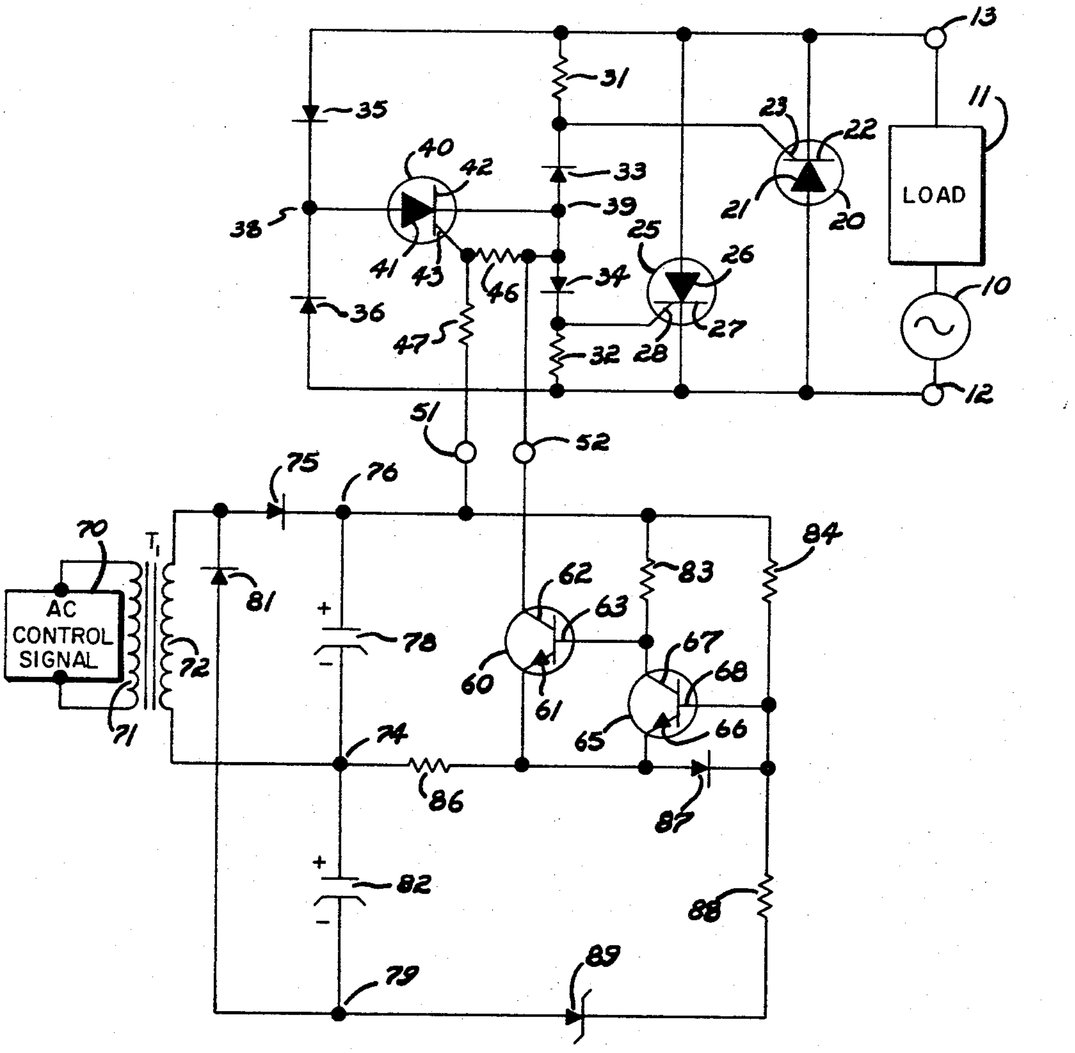
INVENTOR.
BALTHASAR H. PINCKAERS
BY Omund R. Dahle
ATTORNEY

1

3,373,296

AC MAGNITUDE RESPONSIVE ELECTRONIC RELAY

Balthasar H. Pinckaers, Edina, Minn., assignor to Honeywell Inc., a corporation of Delaware
Filed Oct. 2, 1964, Ser. No. 401,100
4 Claims. (Cl. 307—247)

This invention is concerned with a control circuit and more particularly with an electronic relay actuated by a variable magnitude, bidirectional signal.

The replacement of mechanical devices by electronic or semiconductive devices which perform analogous functions offers numerous advantages, such as the longer life and lower maintenance needs required of semiconductor devices which replace mechanical contacts. The purpose of this invention is to replace a bidirectional or AC relay with a semiconductor network having a pair of parallel-inverse connected controlled rectifiers, for example, to replace the relay contacts, and having a unique turn-on circuit for establishing a differential by furnishing a step input to the controlled rectifiers upon reaching a certain signal magnitude, and by suddenly removing the input when the signal magnitude is decreased by a predetermined amount. The turn-on circuit includes a transformer through which isolation of the control signal from the load is achieved.

In the preferred embodiment of this invention represented in the single figure of the drawing the turn-on circuit contains, briefly, a bistable switching circuit comprising transistors 60 and 65. Transistor 65 is normally biased on to hold off transistor 60. A turn-on voltage level is set through the use of a voltage reference means here shown as a zener diode 89. When the bidirectional or AC control signal 70 is great enough so that the voltage across capacitor 82 will break down diode 89, the resultant current flow will regeneratively turn on transistor 60 to allow a gate current to flow into the control circuit for the parallel-inverse connected controlled rectifiers 20 and 25, which represent the relay contacts, to provide power from the AC voltage source 10 to the load 11.

It is therefore an object of this invention to provide an electronic circuit capable of performing the functions of an AC relay, including isolating the input signal from the load and creating a turn-on differential. Similar to the results obtained with a moving metallic contact, the load is either fully energized or not energized at all.

A further object of this invention is to provide a semiconductor relay network including a controlled set of electronic bidirectional contacts and a turn-on circuit for providing control energy to the contacts, including means for establishing a differential such that the turn-on voltage is greater than the hold-on voltage.

Another object of this invention is to provide a turn-on circuit for a set of bidirectional electronic contacts having a control circuit, in which turn-on circuit there is a bistable switch which in one mode will provide current to the control circuit, a voltage reference device for determining the voltage at which the current to the control circuit will be provided, and impedance means so situated as to create a differential.

These and other objects of this invention will become apparent upon consideration of the accompanying claims, specification and drawing of which:

The single figure of the drawing is a schematic representation of one embodiment of the electronic bidirectional relay of this invention.

The single figure discloses a pair of contacts 12 and 13 across which are serially connected a source of bidirectional or AC energy 10 and a load 11. There is also shown a pair of controlled rectifiers 20 and 25. Controlled rectifier 20 has an anode 21, a cathode 22 and a gate 23. Controlled rectifier 25 has an anode 26, a cathode 27, and a gate 28. Cathode 22 and anode 26 are connected to terminal 13, while anode 21 and cathode 27 are connected to terminal 12, such that controlled rectifiers 20 and 25 are connected in parallel-inverse relation across terminals 12 and 13. Another serial branch connected across terminals 12 and 13 contains, in sequence, resistor 31, a pair of oppositely poled diodes 33 and 34, and a resistor 32. Another pair of oppositely poled diodes 35 and 36 are serially connected across terminals 12 and 13. There is also shown another controlled rectifier 40 having an anode 41, a cathode 42 and a gate 43. Anode 41 is connected to a terminal 38 between diodes 35 and 36. Cathode 42 is connected to a terminal 39 between diodes 33 and 34. Cathode 43 is connected through a resistor 46 to terminal 39. Gate 43 is also connected by a resistor 47 to a control input terminal 51. Terminal 39 is connected to another control input terminal 52. Thus controlled rectifier 40, resistors 46 and 47, and diodes 33, 34, 35, and 36 comprise a control circuit for controlled rectifiers 20 and 25.

A turn-on circuit for providing current to the control input terminals 51 and 52 is here shown as including a bistable switch comprising transistors 60 and 65. Transistor 60 has an emitter 61, a collector 62 and a base 63. Transistor 65 has an emitter 66, a collector 67 and a base 68. Collector 62 is connected to terminal 52. Emitter 61 is connected to emitter 66. Base 63 is connected to collector 67. There is also shown a transformer $T_1$ having a primary winding 71 and a secondary winding 72. A source of bidirectional or AC control signal 70 is connected across primary winding 71. A serial combination of a rectifier 75 and a capacitor 78 is connected across secondary winding 72. Another serial combination of a rectifier 81 and a capacitor 82 is also connected across secondary winding 72. Rectifiers 75 and 81 are poled such that capacitors 78 and 82 will charge on alternate half cycles of the bidirectional control signal 70. A terminal 76 between rectifier 75 and capacitor 78 is connected to input terminal 51. Terminal 76 is also connected by a resistor 83 to base 63 of transistor 60, and by a resistor 84 to base 68 of transistor 65. Resistor 86 is connected from a terminal 74 between capacitors 78 and 82 to emitter 66 of transistor 65. A diode 87 is connected between emitter 66 and base 68 of transistor 65. A serial combination of a resistor 88 and a voltage reference device here shown as a Zener diode 89 is connected between base 68 of transistor 65 and a terminal 79 between capacitor 82 and rectifier 81. Zener diode 89 is poled so that its cathode is in the positive current path of the charge across capacitor 82.

The operation of the embodiment represented in the single figure may be best understood by first assuming that the magnitude of AC control signal 70 is small enough so that the load 11 is not yet to be energized. Due to the half wave rectification action of rectifiers 75 and 81, capacitors 78 and 82 will charge to substantially equal voltages having the polarities shown. The charge on capacitor 82 will not yet be great enough to reach the predetermined level of the voltage reference means here shown as Zener diode 89. The charge on capacitor 78 will cause a current flow from the positive plate of capacitor 78 through terminal 76, through resistor 84, from base 68 to emitter 66 of transistor 65, and back through resistor 86 and terminal 74 to the negative plate of capacitor 78. This base to emitter current will cause transistor 65 to turn on, which will essentially place base 63 at the same potential as emitter 61 of transistor 60. This will cause transistor 60 to be held off, and therefore no current will flow in the circuit involving resistor 46 and collector 62 of transistor 60. It should be noted here that the current flow described above will cause a voltage drop across resistor 86 which will be positive at the end nearest emitter 66 and negative at the end nearest terminal 74. This voltage drop, when increased with the turn on of transistor 60, will play an important part in establishing the differential for this electronic relay.

As the magnitude of the control signal 70 increases, a greater voltage appears in the secondary winding 72 of transformer $T_1$ and thus a greater voltage will appear on capacitors 78 and 82. When the voltage on capacitor 82 reaches the predetermined reference level of Zener diode 89 a current will begin to flow from the positive terminal of capacitor 82 through terminal 74, through resistor 86, from emitter 66 to base 68 then through resistor 88 and Zener diode 89, and then back through terminal 79 to the negative terminal of capacitor 82. This current when of sufficiently high magnitude will start to turn off transistor 65, which will in turn cause the potential of base 63 of transistor 60 to rise toward the potential on the positive plate of capacitor 78. Thus, as base 63 becomes positive with respect to emitter 61 of NPN transistor 60, transistor 60 will start to turn on. When transistor 60 starts turning on there will be a current flow from the positive plate of capacitor 78 through terminal 76 and into terminal 51, through resistors 47 and 46 and out through terminal 52, from collector 62 to emitter 61 of transistor 60, then through resistor 86 and back through terminal 74 to the negative plate of capacitor 78.

Once transistor 60 has started to turn on, there will be a corresponding increase in the total current flow through resistor 86. Therefore, the voltage drop across resistor 86 will increase, as previously mentioned. This voltage drop, which is positive at the end of resistor 86 closest to emitter 66 of transistor 65 and negative at the end of resistor 86 closest to terminal 74, will be additive to the voltage on capacitor 82 to thus increase the voltage tending to turn off transistor 65. As a result the current through transistor 65 will decrease further, with a consequent increase in current through transistor 60 and a still further increase in the voltage drop across resistor 86. It is thus apparent that at some predetermined value of AC signal input magnitude, transistor 60 will be suddenly completely turned on due to the regenerative action described above. A differential action can be achieved by giving resistor 86 a resistance value such that the circuit is overdriven, so that the input may actually decrease below the turn-on magnitude before transistor 60 is suddenly completely turned off, this action is more fully described below.

The current flow through resistor 46 will provide a gate current to turn on controlled rectifier 40, which has a positive voltage drop from anode 41 to cathode 42 due to the full wave bridge effect of diodes 33, 34, 35, and 36. Assuming that terminal 13 is positive with respect to terminal 12, there will be a current flow from terminal 13 through diode 35, through terminal 38, through controlled rectifier 40 to terminal 39, then through diode 34 and resistor 32 to terminal 12. The current through resistor 32 will provide a gate current to turn on controlled rectifier 25, and since terminal 13 is positive with respect to terminal 12, anode 26 will be positive with respect to cathode 27 and controlled rectifier 25 will turn on to connect load 11 across the source of energy 10. Assuming now that the turn-on current through resistor 46 is still present and that bidirectional source of energy 10 has changed polarities such that terminal 12 is positive with respect to terminal 13, there will now be a current flow from terminal 12 through diode 36, from terminal 38 through controlled rectifier 40 to terminal 39, then through diode 33 and resistor 31 to terminal 13. The current flow through resistor 31 will provide a gate current to controlled rectifier 20 and, since terminal 12 is positive with respect to cathode 22 and controlled rectifier 20 will therefore turn on to connect load 11 across the source of energy 10. At the same time cathode 27 will be positive with respect to anode 26 to thus turn off controlled rectifier 25. This sequential half cycle turn on of controlled rectifiers 20 and 25 will continue as long as there is a current through resistor 46 sufficient to gate on controlled rectifier 40.

When the magnitude of control signal 70 is decreased, transistor 65 will not immediately be biased on since the voltage drop across resistor 86 is now added to the voltage on capacitor 82. Eventually, as the magnitude of control signal 70 continues to decrease, the combined potentials across capacitor 82 and resistor 86 will not be sufficient to hold off transistor 65, and the potential across capacitor 78 will cause base 68 to become positive with respect to emitter 66 to turn on transistor 65 and again, in a regenerative manner, bring the potential of base 63 to the same level as that of emitter 61 to turn off transistor 60. The turn off of transistor 60 will immediately cause the voltage drop across resistor 86 to decrease and tend to turn transistor 65 on even stronger. The turn off of transistor 60 will also remove the current flow through resistor 46 and thus turn off controlled rectifier 40 to stop the sequential turn on of controlled rectifiers 20 and 25 and thus remove power from the load 11.

The current described above may be seen to be analogous to that of an AC relay. Controlled rectifiers 20 and 25 represent the contacts of the relay and provide a bidirectional current path for load 11 and source of energy 10. The bistable switch comprising transistors 60 and 65 provides a turn-on current for controlled rectifiers 20 and 25, and, in combination with resistor 86, provides a differential which causes the relay action of a turn-on voltage greater than that of the hold-on voltage. The transformer $T_1$ provides isolation between the control signal and the load.

The embodiment as described above utilizes a Zener diode to provide a reference voltage for turn-on, however, it should be noted that other voltage reference devices may be used, a neon glow tube for example.

It will be obvious that the general principles herein disclosed may be embodied in many other forms other than that specifically illustrated, without departing from the spirit of the invention as defined in the following claims.

What is claimed is:

1. A control comprising:

a transformer having primary and secondary windings;

a source of bidirectional signal energy connected to said primary winding;

first voltage rectifying means including a first capacitor connected to said secondary winding;

second voltage rectifying means including a second capacitor connected to said secondary winding;

first switching means having input, output and control electrodes;

biasing means connecting said first switching means output and control electrodes to one terminal on said first capacitor to bias said first switching means normally on;

impedance means connecting said first switching means input electrode to another terminal on said first capacitor and to one terminal on said second capacitor;

means including a voltage reference diode connecting said first switching means control electrode to another terminal on said second capacitor;

second switching means having input, output and control electrodes;

means connecting said second switching means control electrode to said first switching means output electrode;

means connecting said second switching means input electrode to said first switching means input electrode;

and means connecting said second switching means output electrode to a load.

2. Control means comprising:

a transformer having a primary winding and secondary winding;

a source of bidirectional signal energy connected across said primary winding;

a first circuit including a first diode and a first capacitor connected across said secondary winding;

a second circuit including a second diode and a second capacitor connected across said secondary winding;

bistable switch means having input and output circuits;

first biasing means connecting said input circuit to said first capacitor to bias said bistable switch means off;

second biasing means including a portion of said first biasing means and a voltage reference device connecting said input circuit to said second capacitor so that when a predetermined voltage is felt across said second capacitor, said biastable switch means will be switched on;

and load means connected to said output circuit.

3. In an electronic relay including an electronic contact having a control circuit, remote actuating means for said control circuit comprising:

transformer means including a primary and a secondary winding;

first rectifying means connected across said secondary winding including a first capacitor;

second rectifying means connected across said secondary winding including a second capacitor;

bistable switch means having an input and an output circuit;

means connecting said input circuit across said first capacitor so that said bistable switch means is normally biased in a first mode;

means connecting said output circuit and said control circuit in circuit across said first capacitor so that when said bistable switch means is switched to a second mode, said control circuit will receive actuating current for said electronic contact;

means including a voltage reference device connecting said second capacitor to said input circuit so that when the voltage on said second capacitor reaches a predetermined level set by said voltage reference device, the change in current at said input circuit will switch said bistable switch means.

4. In an electronic relay including an electronic contact having a control circuit, means for providing control current to said control circuit comprising:

first energy storage means connected to means for providing energy;

bistable switch means having an input and an output circuit;

means connecting said input circuit across said first energy storage means;

means including said control circuit connecting said output circuit across said first energy storage means;

second energy storage means connected to means for providing energy;

voltage reference means;

and means including said input circuit connecting said voltage reference means across said second energy storage means, so that when said second energy storage means reaches a predetermined magnitude of charge said voltage reference means will cause a change in current to actuate said bistable switch means.

No references cited.

J. S. HEYMAN, *Primary Examiner.*

R. H. PLOTKIN, *Assistant Examiner.*